United States Patent [19]

Brezny et al.

[11] Patent Number: 5,427,721
[45] Date of Patent: Jun. 27, 1995

[54] METHOD OF MAKING MICROCELLULAR CERAMIC BODIES

[75] Inventors: Rasto Brezny, Catonsville; Robert M. Spotnitz, Baltimore, both of Md.

[73] Assignee: W. R. Grace & Co.-Conn., New York, N.Y.

[21] Appl. No.: 144,949

[22] Filed: Oct. 29, 1993

[51] Int. Cl.$^6$ ............................................. C04B 38/00
[52] U.S. Cl. ...................................... 264/44; 264/60; 264/63
[58] Field of Search ............................ 264/44, 63, 60

[56] References Cited

U.S. PATENT DOCUMENTS

| | | | |
|---|---|---|---|
| 4,197,118 | 4/1980 | Wiech | 264/63 |
| 4,283,360 | 8/1981 | Henmi | 264/63 |
| 4,765,950 | 8/1988 | Johnson | 264/63 |
| 5,059,388 | 10/1991 | Kihara | 264/63 |

*Primary Examiner*—James Derrington
*Attorney, Agent, or Firm*—Mary Ann Capria

[57] ABSTRACT

Porous monolithic ceramic bodies containing reticulated macropores are produced by:
 a) forming a mixture of ceramic material particles, a first organic material and a second organic material,
 b) dissolving the first and second organic materials in each other to form a homogeneous solution, whereby the ceramic particles form a dispersion in the homogenous solution,
 c) forming the dispersion into a shape,
 d) cooling the shape at a rate sufficient to induce the non-equilibrium phase separation, thereby forming a first phase rich in the first organic material and a second phase rich in the second organic material, wherein at least a portion of the ceramic particles are segregated in the first phase,
 e) removing the second phase from the phase separated shape to form a porous shape,
 f) firing the porous shape to remove the any of the organic materials contained in the first phase and to sinter the segregated ceramic particles to form the porous monolithic ceramic body.

The sintering step may be carried out to partial completion in order to obtain a monolith having an additional porosity in the submicron range whereby the monolith would have a bimodal pore size distribution.

25 Claims, No Drawings

METHOD OF MAKING MICROCELLULAR CERAMIC BODIES

BACKGROUND OF THE INVENTION

Porous monolithic ceramic bodies are finding expanded uses in various industrial applications as catalyst supports, filters, burner supports, and bioremediation supports. In these various applications, characteristics such as pore volume, pore size distribution, degree of open (reticulated) porosity, etc. are important to the performance of the monolithic ceramic body.

Various techniques have been used to make these monolithic bodies. For example, porous monoliths have been formed by partial sintering of shaped ceramic powder compacts. In other methods, foams have been used to generate porosity in a green ceramic body which is then fired to preserve porosity corresponding to the foam cells. Another method has been proposed in German patent application 40 33 626 whereby thin ceramic membranes are formed by coagulation of a polymer ceramic mixture in a precipitation bath.

These various methods have one or more disadvantages such as inability to form porous bodies having narrow pore size distribution, inability to form three dimensional bodies, inability to produce adequate reticulated porosity, inability to adequately control pore size, etc. The partial sintering method can produce porous three dimensional bodies, but the bodies usually have limited reticulated porosity. The foam methods can be used to make bodies with higher porosity, but the pore size and pore size distribution can be difficult to control especially if a narrow distribution of pores of less than 100 μm are desired. The coagulation method presents difficulties in forming three dimensional bodies of uniform porosity.

Thus, there is a need for new and improved methods of forming porous monolithic ceramic bodies.

SUMMARY OF THE INVENTION

The invention provides a new method for forming porous monolithic ceramic bodies having narrow pore size distribution. The method is capable of forming strong monoliths having substantial reticulated pore volume. In general, the method provides improved control over the porosity characteristics in the monolithic ceramic. The invention is partly based on the discovery that the method for producing porous organic polymers disclosed in U.S. Pat. No. 4,247,498 can be modified to create a method for producing porous monolithic ceramic bodies.

The invention encompasses a method of forming a porous monolithic ceramic body containing reticulated pores, the method comprising:
a) forming a mixture of ceramic material particles, a first organic material and a second organic material wherein
   i) the first and second organic materials differ from each other in composition, and
   ii) the first and second organic materials are capable of forming a homogeneous solution together, which homogeneous solution is capable of undergoing a non-equilibrium liquid-liquid phase separation on cooling,
b) dissolving the first and second organic materials in each other to form a homogeneous solution, whereby the ceramic particles form a dispersion in the homogenous solution,
c) forming the dispersion into a shape,
d) cooling the shape at a rate sufficient to induce the non-equilibrium phase separation, thereby forming a first phase rich in the first organic material and a second phase rich in the second organic material, wherein at least a portion of the ceramic particles are segregated in the first phase,
e) removing the second phase from the phase separated shape to form a porous shape,
f) firing the porous shape to remove the any of the organic materials contained in the first phase and to sinter the segregated ceramic particles to form the porous monolithic ceramic body.

The sintering step may be carried out to partial completion in order to obtain a monolith having an additional porosity in the submicron range whereby the monolith would have a bimodal pore size distribution. If desired, fugitive solid materials may be added in step a) whereby those materials are removed during the firing to impart additional porosity. Various ceramic materials or combinations of materials may be used to form monolithic bodies of corresponding composition. Also, other materials such as reinforcing materials or fillers can be added (e.g. whiskers, fibers, platelets, etc.) as long as they do not unduely interfere with the phase separation or the sintering steps. Heating may be used to facilitate forming of the homogeneous solution of step b).

The process of the invention is capable of achieving porous monolithic ceramic bodies of various two or three dimensional shapes. The bodies produced preferably have a macropore cell diameter (defined below) averaging about 10–300 μm and an average intercell pore diameter (defined below) of about 1–100 μm. For the partially sintered embodiment, the submicron pores preferably have diameters averaging 0.001–0.1 microns in diameter.

These and other aspects of the invention will be described further below.

DETAILED DESCRIPTION OF THE INVENTION

The method of the invention is based on the discovery that the method for producing porous organic polymers disclosed in U.S. Pat. No. 4,247,498 can be modified to create a method for producing porous monolithic ceramic bodies. The disclosures of U.S. Pat. Nos. 4,247,498 and 4,519,909 are incorporated herein by reference.

The basic method of the invention for forming porous monolithic ceramic bodies comprises:
a) forming a mixture of ceramic material particles, a first organic material and a second organic material wherein
   i) the first and second organic materials differ from each other in composition, and
   ii) the first and second organic materials are capable of forming a homogeneous solution together, which homogeneous solution is capable of undergoing a non-equilibrium liquid-liquid phase separation on cooling,
b) dissolving the first and second organic materials in each other to form a homogeneous solution, whereby the ceramic particles form a dispersion in the homogenous solution,
c) forming the dispersion into a shape, d) cooling the shape at a rate sufficient to induce the non-equilibrium phase separation, thereby forming a first phase rich in the first organic material and a second phase rich in the second organic material, wherein at least a portion of the ceramic particles are segregated in the first phase, e) removing the second phase from the phase separated shape to form a porous shape, f) firing the porous shape to remove the any of the organic materials contained in the first phase and to sinter the segregated ceramic particles to form the porous monolithic ceramic body.

The relative proportions of the first and second organic materials which exhibit the desired phase separation behavior will vary somewhat depending on the specific organic materials system used. The range of relative proportions which exhibit the phase separation behavior for a given system of organic materials may also vary depending on the cooling rate selected. U.S. Pat. No. 4,247,498 provides a detailed discussion regarding the phase separation behavior. Surprisingly, however, it has been found that high loadings of ceramic particles do not prevent the phase separation phenomenon from taking place. The loading and characteristics of the ceramic material may have some effect on the relative proportions of the organic materials which exhibit the desired phase separation effect at a given cooling rate. Subject to the factors noted above regarding the phase separation behavior, preferably the first organic material forms about 10–90 wt. % of the total combination of first and second organic materials. In general, the macroporosity of the ceramic monolith increases with the amount of the second organic material present. The loading of ceramic may vary depending on the organic system chosen and the ability to adequately blend the system. Preferably, the Ceramic material forms about 40–80 vol. % based on the total volume of the first organic material and the ceramic material.

The first and second organic materials and the ceramic material may be mixed using any suitable mixing means. Any order of addition may be employed. If mixing is done at a temperature where one of the organic materials exists as a solid and the other as liquid, it is preferred to combine the ceramic material particles with the liquid (typically the second organic material) first. In some systems, it may be desirable to add a minor amount of dispersant to the mixture in step a) to facilitate dispersion of the ceramic material. If used, the amount of dispersant is preferably about 0.1–5 wt. % based on the weight of the ceramic material.

The dissolving step may be performed simultaneously with the mixing step if the first and second organic materials are mutually soluble at ambient temperature or if the initial mixing is conducted at an elevated temperature where the mutual solubility occurs. Alternatively, the mixture may be heated in a separate step to a temperature where the dissolution can take place. For most organic systems of interest, elevated temperature is required to achieve a homogeneous solution of the first and second organic materials. The elevated temperature required for dissolution may vary depending on the specific organic system and the relative proportions therein. Preferably, the mixture is heated to about 100°–300° C. to achieve the dissolution. During the dissolution, the mixture is preferably agitated in orders. to achieve a uniform dispersion of the ceramic particles in the homogenous solution.

Once a suitable dispersion is formed, the dispersion is then formed into a desired shape. The options regarding shape formation technique and the shape formed may depend on the flow and heat transfer characteristics of the dispersion as well as the available cooling means and the desired pore structure in the monolithic ceramic product. For example, a high viscosity dispersion may be suitable for shaping by extrusion or pressing. An intermediate viscosity material might be suitable for shaping by injection molding. A lower viscosity dispersion may be more suitable for casting into a mold or onto a sheet, plate, etc. If the dispersion has good heat transfer characteristics (e.g. it has good thermal conductivity), then it may be possible to form a shape of greater thickness without the occurrence of undesired temperature gradients or unacceptably low cooling rate. Similarly, the availability of better cooling means may enable the production of larger bodies. If the occurrence of a less uniform pore structure is desired or can be tolerated, then shapes that have poorer cooling characteristics may be made.

Given these factors, the thickness and size of the shape are limited only by the ability to cool the shape in a manner which gives the desired phase separation and resulting pore structure. In as much as the ceramic material contained in the dispersion improves its heat transfer characteristics, it is possible to produce phase separated bodies of larger dimension than described in the above-noted patents relating to polymer processing.

If desired, the shaping may involve the formation of a composite laminate of two or more layers by coextrusion of the mixture with a different phase separable mixture or other suitable material which can be cofired after phase separation. Alternatively, composite laminates maybe formed by coating a substrate with the mixture followed by phase separation and firing whereby a porous layer is adhered to the substrate. In another alternative embodiment, the mixture may be poured to surround a compatible reinforcing structure such as a grid or fiber mat.

Depending on the shaping technique selected, the cooling step d) may occur simultaneously with the shaping. For example, if the shape were cast onto a sufficiently cool plate, cooling of the dispersion and the resulting phase separation could occur in the casting process. In general where a more homogeneous pore distribution is desired, it is preferred to avoid significant cooling during the shaping step. Cooling can be avoided by use of heated shaping apparatus, molds, atmospheres, etc.

The cooling step preferably induces a phase separation in the homogeneous solution portion of the shaped dispersion. Thus, a first phase is formed having a higher percentage (compared to the second phase) of the first organic material based on the total of said first and second organic materials. A second phase is also formed having a higher percentage of the second organic material compared to the first phase. Preferably at least some of the ceramic particles are segregated in the first phase. More preferably, a majority of the ceramic particles are segregated in the first phase. The second phase is preferably present as inclusions within the first phase. Some or all of the inclusions are preferably interconnected. The second phase inclusions can be spherical, but often lose that appearance as interconnection becomes more extensive.

Cooling step d) involves cooling the shaped dispersion at a rate and to a temperature sufficient to induce the phase separation. Typically, a range of permissible cooling rates exists for a given organic system. The cooling rate can affect the nature of the resulting porosity as described extensively in U.S. Pat. No. 4,247,498. Thus, more rapid cooling rates tend to lead to smaller second phase inclusions within the first phase. For most organic systems, the cooling step involves a change from elevated temperature to ambient temperature. There may be certain organic systems which exhibit the phase separation phenomenon on cooling down from ambient temperature. In any event, the cooling rate is preferably not so fast as to prevent the phase separation from occurring. In some cases, rapid cooling of the surface of the mixture maybe desired in order to form a non-porous outer surface (skin). Also, the cooling rate is preferably not too slow otherwise the thermodynamic bulk separation will occur rather than the desired non-equilibrium phase separation. The cooling rates discussed in U.S. Pat. No. 4,247,498 are suitable for purposes of this invention. Any suitable cooling method can be employed such as refrigeration, cooling by exposure to ambient air, etc. Preferably, at least the first phase of the shape is substantially solid after the cooling is completed.

Once the phase separated shape is obtained, the shape is then treated to remove the second phase. Any suitable method which does not destroy the structure of the first phase may be used. Examples of suitable methods are extraction by contact with a selective solvent, evaporation, sublimation, etc. Solvent extraction is preferred. On removal of the second phase, the shape now comprises the first phase and porosity where the second phase was removed. In some instances where a solvent selective for the second organic material is used, a minor amount of additional porosity may result in the first phase structure due to extraction of the second organic material from the first phase.

In some instances, it may be desired to alter the shape in some fashion prior to removal of the second phase such as by cutting or other means. Performing any desired alterations to the shape before removal of the second phase is more preferable in that distortion of the porosity configuration is likely to occur if such changes are attempted after removal of the second phase. Also, after sintering, alteration of the shape may involve the need for more costly machining due to the hardness of the sintered monolith.

The porous shape containing the first phase and ceramic particles is then fired to remove the remaining organic material and to sinter the ceramic particles thereby forming a porous monolithic body. The firing is preferably conducted such that the removal of the remaining organic material does not cause destruction of the pore structure. If desired, the organic removal and ceramic sintering may be carried out as distinct process steps. For most crystalline ceramics, the organic materials are removed far below the ceramic sintering temperature. If the ceramic particles are amorphous, there may be some overlap of these processes.

The firing conditions for sintering are preferably those typically used for the given ceramic material. The sintering step may be carried out to completion (i.e. elimination of most of the interparticle submicron porosity.) Alternatively, the sintering may be stopped prior to completion in order to retain some interparticle submicron porosity. In any event, the sintering should be carried out to obtain a monolithic ceramic body of sufficient strength for the contemplated end use.

The starting ceramic material may be virtually any crystalline or amorphous ceramic amenable to sintering. Combinations of different ceramics may be used if desired. Some preferred ceramic materials are selected from the group consisting of alumina, titania, zirconia, silica, nitrides, carbides and mixtures thereof. The average particle size of the ceramic material is preferably about 0.1–1.0 $\mu$m. If desired, a sintering aid for the ceramic material may be added to the mixture in step a) such that at least a portion of the sintering aid is present with the ceramic particles during the firing step.

In some circumstances, it may also be desirable to add a fugitive solid material in particle form to the mixture in step a) such that at least a portion of that fugitive material remains in the first phase, but is removed during firing to create further porosity in the fired ceramic. Carbon particles are generally preferred for this purpose.

Fillers or reinforcing materials such as platelets, fibers, whiskers, etc. may also be added to the mixture. The fillers or reinforcing materials should not unduely interfere with the phase separation or sintering steps.

The first organic material is preferably a polymer or polymer blend such as those described in U.S. Pat. No. 4,247,498. Polyolefins are generally more preferred with polyethylene being most preferable. The second organic material is preferably a compatible liquid as described in U.S. Pat. No. 4,247,498. Oils are more preferred with sebacate oils such as dibutyl sebacate, dibutoxyethyl sebacate and mixtures thereof being most preferred. It has been found that use of blends of sebacate oils can be used to obtain very large cell diameters averaging on the order of 200–300 $\mu$m.

Any suitable dispersant for dispersing the ceramic particles in the selected organic materials may be used. The dispersant should not adversely interfere with the phase separation behavior of the selected first and second organic materials.

The macroporosity of the resulting porous monolithic ceramic body may be characterized in substantially the same manner as used to describe the pore structure in U.S. Pat. No. 4,247,498. The various parameters discussed above can be manipulated to make bodies having cell sizes averaging from about 5–300 $\mu$m, more preferably about 10–100 $\mu$m. The pore size, as defined in U.S. Pat. No. 4,247,498, is preferably about 1–100 $\mu$m on average depending at least in part on the average cell size. Where submicron porosity is also achieved by partial sintering and/or by use of fugitive particles, the submicron pores preferably average about 0.001–0.1 microns in diameter. The pore volume of the ceramic body can be varied depending on the degree of sintering, the loading of the ceramic in the initial mixture, the amount of second phase formed and possibly other parameters. In general, the sintered body preferably has a pore volume of about 40–90 vol. %.

These and other aspects of the invention are illustrated in the following examples. The invention is not limited to the specific details of the examples.

EXAMPLE 1

20 g Al$_2$O$_3$ (Sumitomo AKP-50)

40 g Dibutyl sebacate 5 g polyethylene (Exxon Exact ® 3002)

The alumina was a very fine submicron powder which was added to the dibutyl sebacate (DBS) and sonicated using an ultrasonic horn to disperse the particles. This mixture was heated in a beaker to 210° C. in a silicone oil bath and the polyethylene was mixed in for 1.5 hrs. to form a homogeneous solution. The mixture was cooled to less than 100° C. over an hour to form a rigid body.

The part was placed in 200 ml of hexane overnight to extract the DBS. The part was dried to remove the residual hexane and fired to burn off the polyethylene and sinter the ceramic particles. The sintering schedule was:

3°/min to 400° C.
1°/min to 650° C.
5°/min to 1100° C.
hold 4 hours.

The resulting ceramic part consisted of a reticulated alumina structure of 70% porosity and a narrow macropore size distribution of 10–20 μm average size and a submicron micropore size between the alumina particles. The part had a surface area of 12.6 $m^2/g$ by mercury porosimetry.

EXAMPLE 2

20 g $TiO_2$ (submicron rutile, Unitane OR-460)
40 g DBS
5 g Dupont Sclair® 19 A polyethylene
0.6 g Triton X-100 dispersant The Triton dispersant was dissolved in the DBS. The $TiO_2$ was added and the mix was dispersed with an ultrasonic horn for 3 minutes. The mixture was heated in an oil bath to 210° C. and the polyethylene was added. Stirring continued with a motor driven agitator at 100 rpm for 2 hrs. A portion of the batch was poured into a Teflon® mold to form a 9 channel square honeycomb with 1.6 mm walls. The remainder was cooled in the beaker. The body was extracted in hexane and fired as in Example 1 to form a reticulated structure with 20–30 μm pore channels and 75% porosity and a surface area of 1.5 $m^2/g$ by mercury porosimetry.

EXAMPLE 3

20 g $Al_2O_3$ (Sumitomo AKP-50)
28 g DBS (Dibutyl sebacate)
12 g DBES (dibutoxyethyl sebacate)
5 g Sclair® 19 A polyethylene In this example a mixture of the two oils was used a 70/30 wt % ratio to increase the cell size. The processing was carried out exactly as in example 1.

The resulting body contained 88% porosity with 200–300 μm interconnected pore channels.

What is claimed is:

1. A method of forming a porous monolithic ceramic body containing reticulated pores, said method comprising:
   a) forming a mixture of ceramic material particles, a first organic material and a second organic material wherein
      i) said first and second organic materials differ from each other in composition, and
      ii) said first and second organic materials are capable of forming a homogeneous solution together, which homogeneous solution is capable of undergoing a non-equilibrium liquid-liquid phase separation on cooling,
   b) dissolving said first and second organic materials in each other to form a homogeneous solution, whereby said ceramic particles form a dispersion in said homogenous solution,
   c) forming said dispersion into a shape,
   d) cooling said shape at a rate sufficient to induce said non-equilibrium phase separation, thereby forming a first phase rich in said first organic material and a second phase rich in said second organic material, wherein at least a portion of said ceramic particles are segregated in said first phase,
   e) removing said second phase from said phase separated shape to form a porous shape,
   f) firing said porous shape to remove said any of said organic materials contained in said first phase and to sinter said segregated ceramic particles to form said porous monolithic ceramic body having a pore volume of about 40% to about 90%.

2. The method of claim 1 wherein a dispersant is added to said mixture of step a).

3. The method of claim 1 wherein fugitive solid particles are added to said mixture of step a), such that said fugitive particles are removed from said porous shape during step f).

4. The method of claim 1 wherein a sintering aid for said ceramic is added to said mixture in step a).

5. The method of claim 1 wherein said first organic material forms about 10–90 wt. % of said homogeneous solution of step b).

6. The method of claim 1 wherein said ceramic material is present in about 40–80 vol. % based on the total volume of said ceramic material and said first organic material.

7. The method of claim 1 wherein said dissolving step b) comprises heating said mixture.

8. The method of claim 1 wherein said shaping step c) and cooling step d) occur simultaneously.

9. The method of claim 1 wherein said shaping step c) comprises casting said dispersion into a heated mold.

10. The method of claim 1 wherein at least a portion of said second phase is present in said shape of step d) as interconnected, substantially spherical inclusions.

11. The method of claim 10 wherein said porous shape of step e) and said porous monolith resulting in step f) contain interconnected macropores.

12. The method of claim 1 wherein said ceramic particles have an average diameter of about 0.1–1.0 μm.

13. The method of claim 11 wherein said macropores resulting in step f) have an average cell size of about 5–300 μm.

14. The method of claim 1 wherein said ceramic particles are only partially sintered in step f) whereby submicron interparticle pores are retained in said monolithic ceramic body.

15. The method of claim 7 wherein said mixture is heated to about 100–300° C. during step b).

16. The method of claim 1 wherein said first organic material is a polymer or a polymer blend.

17. The method of claim 16 wherein said first organic material is a polyolefin.

18. The method of claim 17 wherein said first organic material is polyethylene.

19. The method of claim 1 wherein said second organic material is an oil or a blend of oils.

20. The method of claim 19 wherein said second organic is a sebacate selected from the group consisting of dibutyl sebacate, dibutoxyethyl sebacate and mixtures thereof.

21. The method of claim 1 wherein said ceramic material is selected from the group consisting of alumina, titania, zirconia, silica, nitrides, carbides and mixtures thereof.

22. The method of claim 1 wherein said second phase is removed in step e) by solvent extraction.

23. The method of claim 1 wherein said cooling step d) includes rapid cooling of a surface of said shape whereby a region of said shape nearest said surface does not undergo phase separation during said cooling step d).

24. The method of claim 1 wherein said shape forming in step c) comprises coextruding said dispersion with another material to form a laminate.

25. The method of claim 1 wherein said shape forming step c) comprises casting said dispersion to surround a reinforcing grid.

* * * * *